United States Patent [19]
Johnson

[11] Patent Number: 5,947,353
[45] Date of Patent: Sep. 7, 1999

[54] TURKEY CALL HOLDING LEG HARNESS

[76] Inventor: Reid P. Johnson, P.O. Box 11, Barnes Rd., Stratford, N.Y. 13470

[21] Appl. No.: 09/002,339

[22] Filed: Jan. 2, 1998

[51] Int. Cl.[6] .................................................. A45F 5/00
[52] U.S. Cl. ...................... 224/267; 224/222; 224/271; 224/678; 224/910; 446/397
[58] Field of Search .................................. 224/910, 907, 224/222, 267, 271, 272, 249, 611, 667, 668; 446/397, 26

[56] References Cited

U.S. PATENT DOCUMENTS

| | | | |
|---|---|---|---|
| 3,199,754 | 8/1965 | Sorensen | 224/222 |
| 4,256,245 | 3/1981 | Serres | 224/271 |
| 4,299,344 | 11/1981 | Yamashita et al. | 224/678 |
| 5,244,430 | 9/1993 | Legursky | 224/267 |

*Primary Examiner*—Linda J. Sholl

[57] ABSTRACT

A turkey call holding leg harness is provided including a pair of straps each having a pair of ends including a first free end and a second end. The second finds have buckles mounted thereon for releasably coupling with the first free ends to define closed loops. Further provided is a pair of adjustable plates mounted between the straps for releasably containing a turkey call.

4 Claims, 2 Drawing Sheets

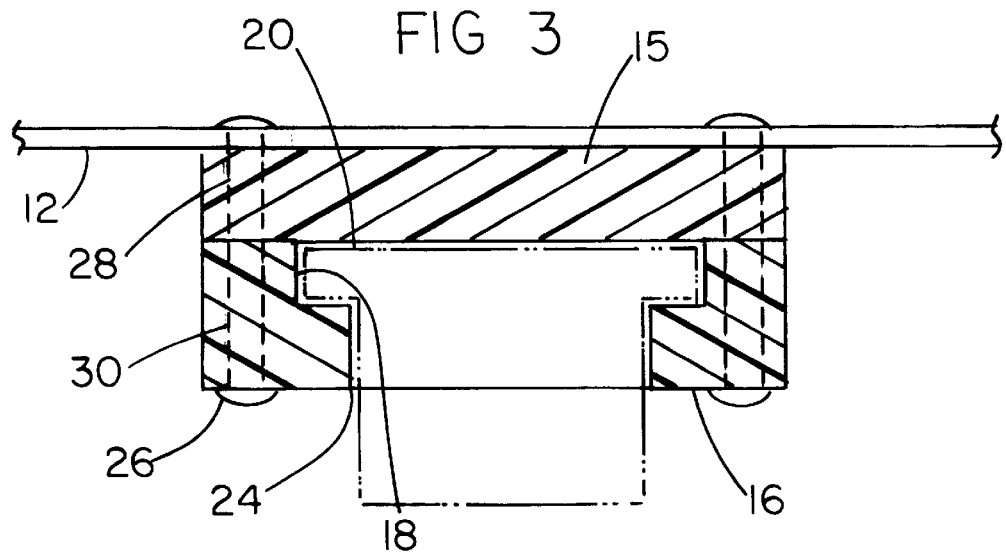
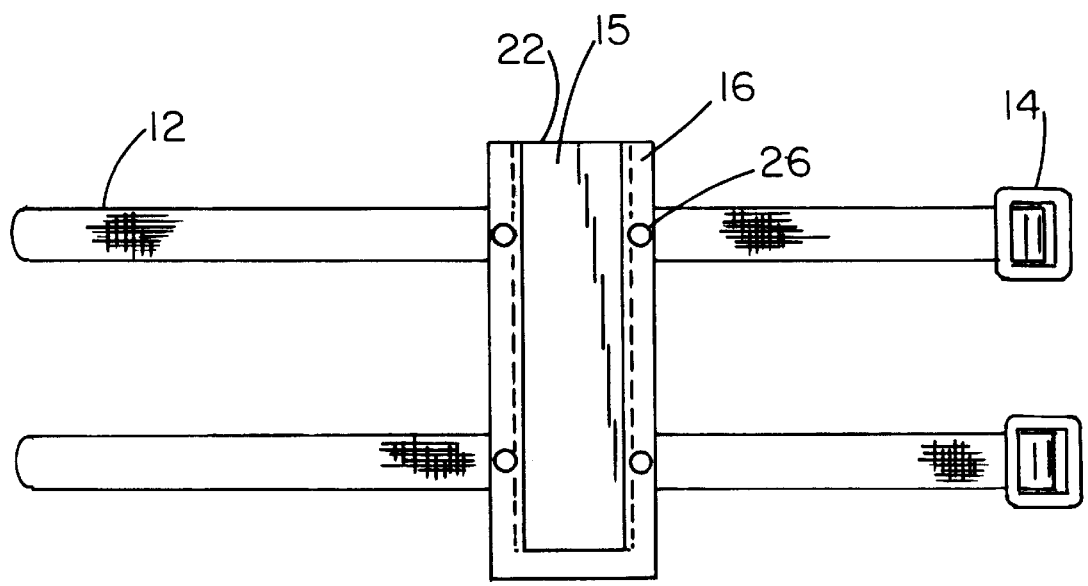

TURKEY CALL HOLDING LEG HARNESS

BACKGROUND OF THE INVENTION

1. Field of the Invention

The present invention relates to a turkey call holding leg harness and more particularly pertains to storing a turkey call of any size on a leg of a user.

2. Description of the Prior Art

The use of turkey call holsters is known in the prior art. More specifically, turkey call holsters heretofore devised and utilized for the purpose of containing a turkey call are known to consist basically of familiar, expected and obvious structural configurations, notwithstanding the myriad of designs encompassed by the crowded prior art which have been developed for the fulfillment of countless objectives and requirements By way of example, the prior art includes U.S. Pat. No. 5,111,981; U.S. Pat. No. 5,263,838; U.S. Pat. No. Des. 315,640; U.S. Pat. No 4,883,171; U.S. Pat. No. 4,055,873; and U.S. Pat. No. 5,437,401.

In this respect, the turkey call holding leg harness according to the present invention substantially departs from the conventional concepts and designs of the prior art, and in so doing provides an apparatus primarily developed for the purpose of storing a turkey call of any size on a leg of a user.

Therefore, it can be appreciated that there exists a continuing need for a new and improved turkey call holding leg harness which can be used for storing a turkey call of any size on a leg of a user. In this regards the present invention substantially fulfills this need.

SUMMARY OF THE INVENTION

In view of the foregoing disadvantages inherent in the known types of turkey call holsters now present in the prior art, the present invention provides an improved turkey call holding leg harness. As such, the general purpose of the present invention, which will be described subsequently in greater detail, is to provide a new and improved turkey call holding leg harness which has all the advantages of the prior art and none of the disadvantages To attain this, the present invention essentially comprises a pair of straps Each of the straps are formed of a thin, flexible and inelastic material each having a planar rectangular configurations Each strap has a pair of ends including a first free end and a second end with a buckle mounted thereon. Such buckle serves for releasably coupling with the first free end to define a closed loop. A diameter of the loop may be selective adjusted during use. With reference now to FIGS. 3 & 4 in particular, a rigid mounting plate is provided having a planar rectangular front and rear face with a thin periphery formed therebetween. The rear face has central extents of the straps mounted thereon such that the straps remain parallel. Further, such coupling ensures that the straps remain spaced an equal distance from a central portion of the mounting plate and reside in perpendicular relationship with sides of the periphery of the mounting plate. During use, the mounting plate may be worn on a leg of a user. Further included is a rigid face plate having a pair of linear side strips maintained in parallel via a bottom strip integrally coupled between bottom ends of the side strips. Each strip of the face plate has a rear face, a front face, an outer periphery and an inner periphery. The face plate has a thickness equal to that of the mounting plate. The outer periphery of the face plate also is also of a similar size and shape as that of the mounting plate. As best shown in FIG. 3, the inner periphery has a rectilinear recess formed along an entire extent thereof adjacent to and in communication with the rear face of the face plate. In other words, the face plate has an L-shaped cross-section along its entirety. Finally, a plurality of bolts include female bolts rotatably situated within in bores formed in the mounting plate between the front and rear face thereof and adjacent to the periphery. The bolts further include male bolts fixedly coupled within bores formed in the face plate adjacent to the outer periphery thereof. As such, the distance between the face plate and the mounting plate may be selectively determined thus accommodating any one of variously sized turkey calls therebetween.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved turkey call holding leg harness which has all the advantages of the prior art turkey call holsters and none of the disadvantages.

It is another object of the present invention to provide a new and improved turkey call holding leg harness which may be easily and efficiently manufactured and marketed.

It is a further object of the present invention to provide a new and improved turkey call holding leg harness which is of a durable and reliable construction.

An even further object of the present invention is to provide a new and improved turkey call holding leg harness which is susceptible of a low cost of manufacture with regard to both materials and labor, and which accordingly is then susceptible of low prices of sale to the consuming public, thereby making such turkey call holding leg harness economically available to the buying public.

Still yet another object of the present invention is to provide a new and improved turkey call holding leg harness which provides in the apparatuses and methods of the prior art some of the advantages thereof, while simultaneously overcoming some of the disadvantages normally associated therewith.

Still another object of the present invention is to store a turkey call of any size on a leg of a user.

Lastly, it is an object of the present invention to provide a new and improved turkey call holding leg harness including a pair of straps each having a pair of ends including a first free end and a second end. The second ends have buckles mounted thereon for releasably coupling with the first free ends to define closed loops. Further provided is a pair of adjustable plates mounted between the straps for releasably containing a turkey call.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top cross-sectional view of the present invention.

FIG. 4 is a front view of the present invention.

Similar reference characters refer to similar parts throughout the several views of the drawings.

DESCRIPTION OF THE PREFERRED EMBODIMENT

Figure 1:
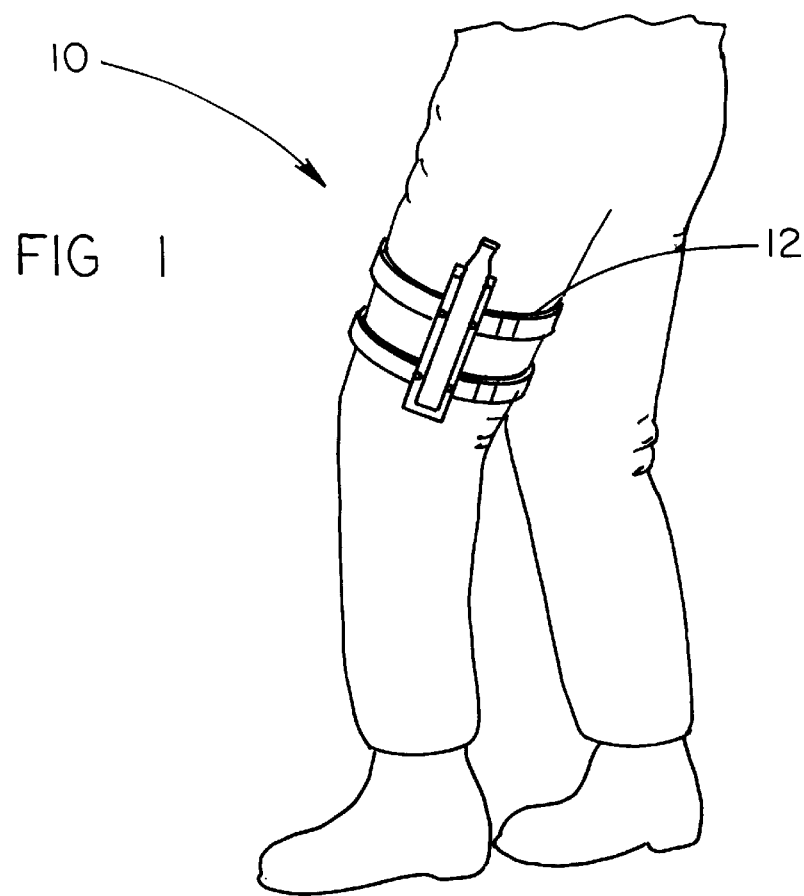
FIG. 1 is a perspective illustration of the preferred embodiment of the turkey call holding leg harness constructed in accordance with the principles of the present invention.
Figure 2:
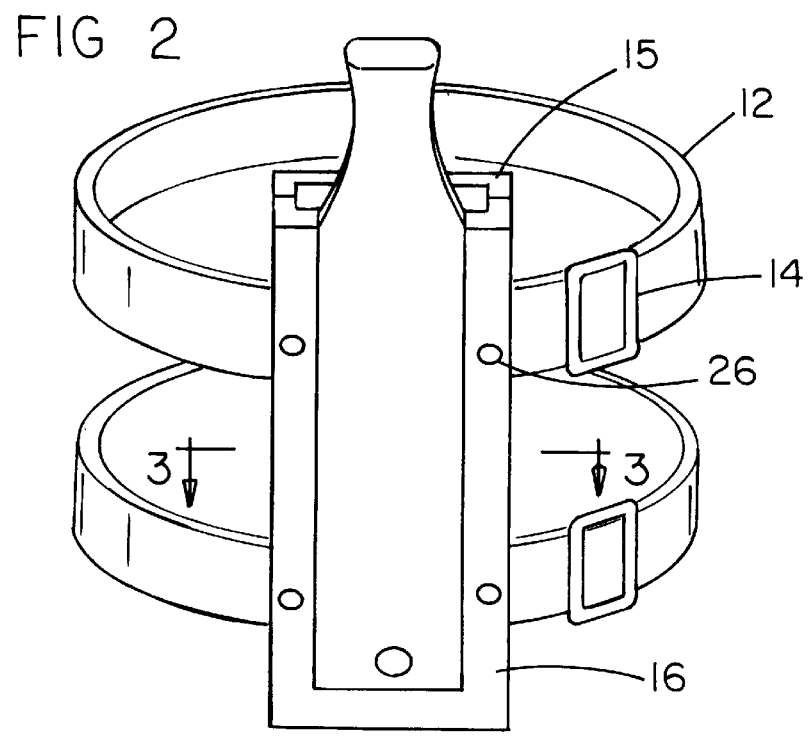
FIG. 2 is a close-up perspective view of the present invention.

With reference now to the drawings, and in particular to FIG. 1 thereof, a new and improved turkey call holding leg harness embodying the principles and concepts of the present invention and generally designated by the reference numeral 10 will be described.

The present invention, the new and improved turkey call holding leg harness, is comprised of a plurality of components. Such components in their broadest context include straps, a mounting plate, and a face plate. Such components are individually configured and correlated with respect to each other so as to attain the desired objective.

More specifically, it will be noted that the system 10 of the present invention, designated is numeral 10, includes a pair of straps 12. Each of the straps are formed of a thin, flexible and inelastic material each having a planar rectangular configuration. Each strap has a pair of ends including a first free end and a second end with a square closed-loop buckle 14 mounted thereon. Such buckle serves for releasably coupling with the first free end to define a closed loop. A diameter of the loop may be selective adjusted during use.

With reference now to FIGS. 3 & 4 in particular, a rigid mounting plate 15 is provided having a planar rectangular front and rear face with a thin periphery formed therebetween. The rear face has central extents of the straps mounted thereon such that the straps remain parallel. Further, such coupling ensures that the straps remain spaced an equal distance from a central portion of the mounting plate. Further, the straps reside in perpendicular relationship with sides of the periphery of the mounting plate. During use, the mounting plate may be worn on a leg of a user.

Further included is a rigid face plate 16 having a pair of linear side strips maintained in parallel via a bottom strip integrally coupled between bottom ends of the side strips. Each strip of the face plate has a rear face, a front face, an outer periphery and an inner periphery. The face plate has a thickness equal to that of the mounting plate. The outer periphery of the face plate is also of a similar size and shape as that of the mounting plate. As best shown in FIG. 3, the inner periphery of the face plate has a rectilinear recess 18 formed along an entire extent thereof adjacent to and in communication with the rear face of the face plate. In other words, the face plate has an L-shaped cross-section along its entirety. As shown in FIG. 3, the face plate defines both a slot 20, an open top 22 and an open front 24.

Finally, a plurality of bolts 26 include female bolts 28 rotatably situated within in bores formed in the mounting plate between the front and rear face thereof and adjacent to the periphery. The bolts further include male bolts 30 fixedly coupled within bores formed in the face plate adjacent to the outer periphery thereof. As such, the distance between the face plate and the mounting plate may be selectively determined thus accommodating any one of variously sized turkey calls therebetween. The bolts are preferably situated only adjacent side edges of the plates and are further used to couple the straps to the mounting plate. In the alternative, various other types of coupling mechanisms may be employed which afford the foregoing function.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention., Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A turkey call holding leg harness comprising, in combination:

a pair of straps each formed of a thin, flexible and inelastic material and having a planar rectangular configuration, each strap having a pair of ends including a first free end and a second end with a buckle mounted thereon for releasably coupling with the first free end to define a closed loop, wherein a diameter of the loop may be selective adjusted;

a rigid mounting plate having a planar rectangular front and rear face with a thin periphery formed therebetween, the rear face having central extents of the straps mounted thereon such that the straps remain parallel and are spaced an equal distance from a central portion of the mounting plate and reside in perpendicular relationship with sides of the periphery of the mounting plate such that the mounting plate may be worn on a leg of a user;

a rigid face plate including a pair of linear side strips maintained in parallel via a bottom strip integrally coupled between bottom ends of the side strips, each strip of the face plate having a rear face, a front face, an outer periphery and an inner periphery, the face plate having a thickness equal to that of the mounting plate, the outer periphery of the face plate also being similar to that of the mounting plate, the inner periphery having a rectilinear recess formed along an entire extent thereof adjacent to and in communication with the rear face of the face plate such that the face plate has an L-shaped cross-section; and a plurality of bolts including female bolts rotatably situated within in bores formed in the mounting plate between the front and rear face thereof and adjacent to the periphery, the bolts further including male bolts fixedly coupled within bores formed in the face plate adjacent to the outer periphery thereof such that the distance between the face plate and the mounting plate may be selectively determined thus accommodating any one of variously sized turkey calls therebetween.

2. A turkey call holding leg harness comprising:

a pair of straps each having a pair of ends including a first free end and a second end with a coupling means mounted thereon for releasably coupling with the first free end to define a closed loop, wherein a diameter of the loop may be selective adjusted, the coupling means includes a buckle; and containment means mounted between the strap for releasably containing a turkey call, the containment means defines a vertically oriented slot with an open top for releasably receiving the turkey call, the containment means is adapted to accommodate turkey calls of various sizes, the containment means includes a pair of rigid plates adapted to be selectively distanced.

3. A turkey call holding leg harness as set forth in claim 2 wherein the plates are distanced via bolts.

4. A turkey call holding leg harness as set forth in claim 2 wherein one of the plates has an L-shaped cross-section along its entire extent.

* * * * *